INVENTORS
T. J. NAVE
M. E. LARKIN

United States Patent Office 3,585,262
Patented June 15, 1971

3,585,262
PARISON PREPINCHING AND PREBLOWING
Thomas J. Nave and Mark E. Larkin, Bartlesville, Okla.,
assignors to Phillips Petroleum Company
Original application Apr. 4, 1966, Ser. No. 539,834, now
Patent No. 3,425,090, dated Feb. 4, 1969. Divided
and this application Aug. 2, 1968, Ser. No. 749,779
Int. Cl. B29c 17/07
U.S. Cl. 264—89
3 Claims

ABSTRACT OF THE DISCLOSURE

An open ended parison is continuously extruded. After a length intermediate the final length has been extruded, the bottom of the parison is sealed. Preblow fluid is introduced into the sealed parison to balloon same, and then the parison is enclosed in a mold and blow molded.

This application is a division of our pending application Ser. No. 539,834, filed Apr. 4, 1966 now Pat. No. 3,425,090.

This invention relates to a method and apparatus for prepinching and preblowing a parison. This invention also relates to apparatus for controlling the prepinching and preblowing of a parison.

Heretofore when blow molding articles which have remote corners, e.g. hollow rectangular containers, the parison upon blowing in the mold came in contact with the sides of the molds before reaching the remote corners. The results of such an operation were an article having unduly thin and weakened corners.

It has been found that undue parison thinning in remote corners of the molds can be counteracted if the parison is prepinched to close off its lower end and make it substantially air-tight. Low pressure fluid, e.g. air, is then introduced into the prepinched parison to preblow the parison, i.e. balloon the parison (partially stretch), to increase the internal volume of the parison at least 5 volume percent or the internal diameter of the parison at least 5 percent so that when the preblown parison is placed in the mold it is already directed towards the remote corners of the molds and the resulting product had a more uniform wall thickness even at these remote corners.

In many cases the articles formed by a particular blow molding process must be carefully controlled to fall within very narrow weight limits and whenever these limits are exceeded the article is of no use and has to be discarded. Further, in many cases the prepinched parison is ruptured by the preblowing air which rendered the parison useless for blow molding.

It has also been found that the reproducible weight and preblow rupture problems can be obviated and a blow molded article having substantially uniform wall thickness even at remote corners still formed by a precise correlation of the prepinching and preblowing operations.

According to this invention there is provided a method for prepinching and preblowing a parison while continuously and uninterruptedly forming that parison and with substantially no rupturing of the preblown parison and with no substantial weight variation between blow molded articles, by forming a first length of an open ended parison in a conventional manner, pinching the parison, preblowing the parison, and then blow molding the preblown parison. To assure against preblow rupture, the prepinched parison can be further formed into a second longer length so that the parison will have an internal volume above the prepinched area sufficient to receive the preblowing fluid without rupturing and only then admitting preblowing fluid to the interior of the prepinched parison. Thus, by this latter aspect no preblow fluid enters the parison during pinching thereof or for a finite time period after such pinching.

The prepinching apparatus of this invention includes a pair of opposed pinch members each rotatably carried on at least one gear means, the gear means for each of the pinch members being meshed with one another and one of these gear means also being meshed with a separate gear means. There is also provided means for moving the separate gear means so as to cause rotation of the pinch-member carrying gear means in either a clockwise or counterclockwise manner and the resultant movement of the pinch members towards or away from one another depending upon the direction of movement of the separate gear means.

The control apparatus of this invention employs an accumulator for supplying parison material to the parison forming means, e.g. an extrusion die, means for moving parison material from the accumulator, and first and second switch means adjacent the means for moving material from the accumulator. An actuating means is carried by the means for moving material from the accumulator and adapted to actuate the first and second switch means. Means is provided for moving the mold parts and this means is connected to the first switch means. A valve means is connected to a fluid operated means which carries the separate gear means that operates the pinch members, the valve means being adapted to pass fluid into the fluid operated means to cause the pinch members to move towards one another and also to pass fluid into the fluid operated means to cause the pinch members to move away from one another and to cause at substantially the same time preblowing fluid to pass through the parison being formed. A time delay means is connected between the switch means and the valve. A normally closed, second valve is connected to the conduit for carrying preblow fluid to the parison. A third switch means is adapted to be actuated when the molds are moved into the open position and in turn to open the normally closed second valve to allow preblow fluid to pass into the parison. A fluid delay means downstream from the second valve is employed to delay the passage of preblow fluid into the parison for a finite time sufficient to allow the formation of a parison of sufficient internal volume to contain the preblow fluid without rupturing.

Accordingly, it is an object of this invention to provide a new and improved method for prepinching and preblowning parisons. It is another object of this invention to provide a new and improved apparatus for prepinching and preblowing parisons. It is another object of this invention to provide a new and improved control apparatus for controlling the prepinching and preblowing operations in a precise sequence of events.

Other aspects, objects, and the several advantages of this invention will be apparent to those skilled in the art from the description, drawings, and appended claims.

Figure 1:
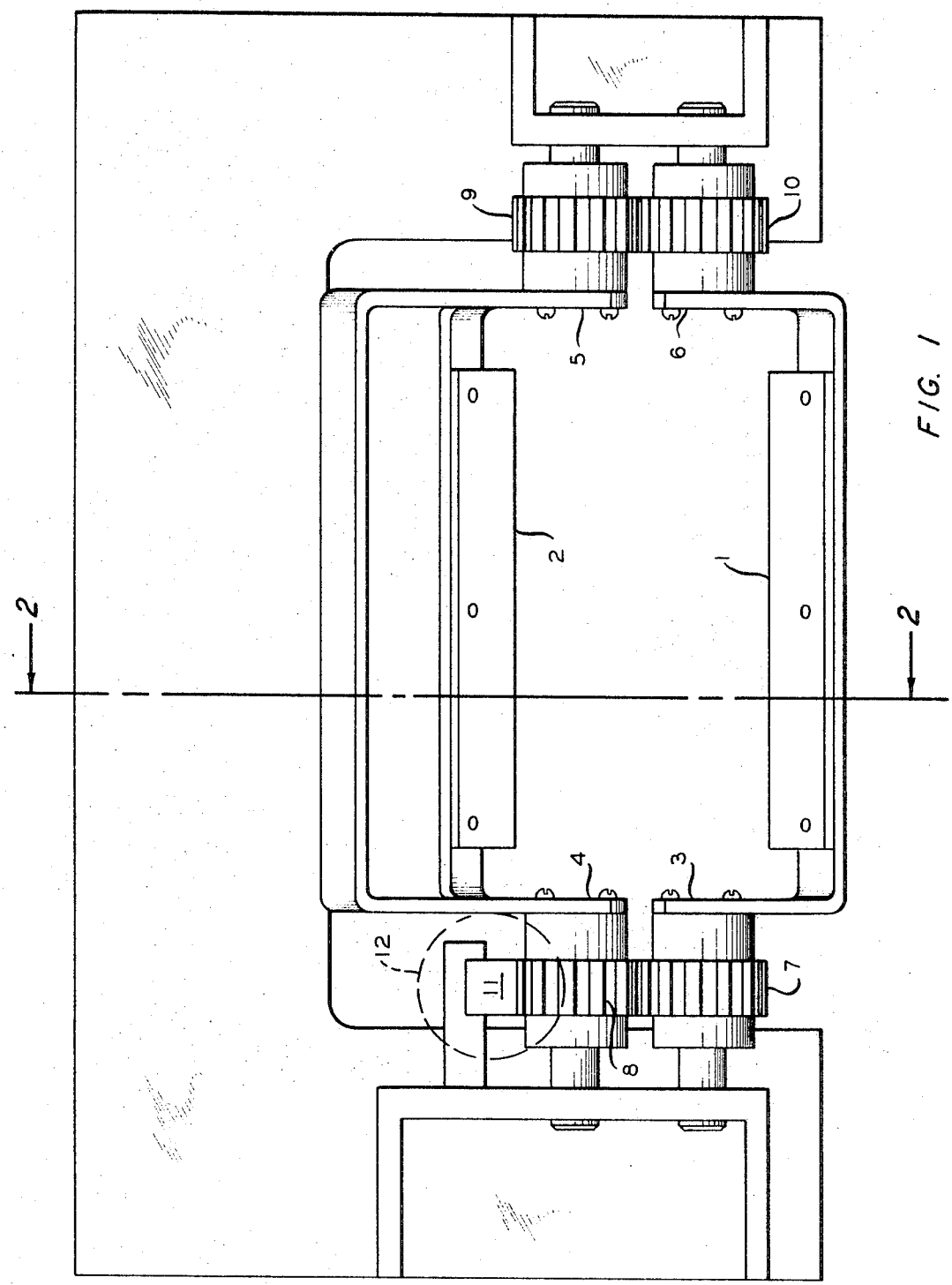
FIG. 1 shows a top view of prepinching apparatus according to this invention.

In FIG. 1 there is shown pinch bars 1 and 2 carried on arms 3 through 6 which arms are attached to circular gears 7 through 10. Gears 7 and 8 and gears 9 and 10 are meshed with one another. Gear 8 is also meshed with rack 11, rack 11 being connected to the piston rod of hydraulic cylinder 12.

Thus, when the piston of cylinder 12 is moved upwardly or downwardly rack 11 is also moved and therefore rotates gear 8. The rotation of gear 8 causes the rotation of gears 7, 9, and 10 thereby causing bars 1 and 2 to move towards or away from one another depending upon the direction of movement of rack 11.

Figure 2:
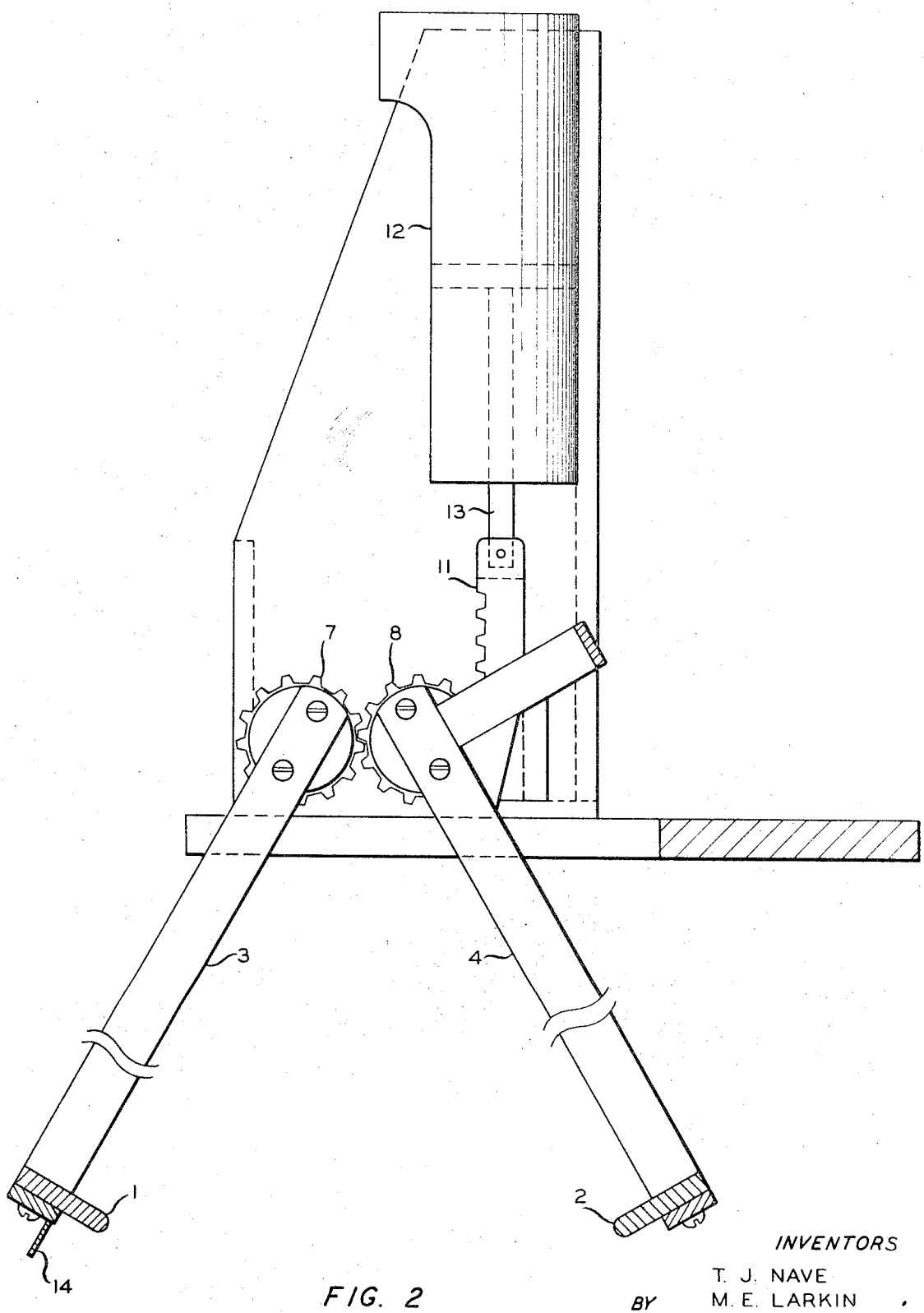
FIG. 2 shows a cross section of the apparatus of FIG. 1.

FIG. 2 shows a cross section of the apparatus of FIG. 1 including piston rod 13 of cylinder 12. Cylinder 12 can be pneumatic, hydraulic, electrical, or any conventional actuating means. Arm 3 is also shown to carry a member 14 which extends along the length of bar 1 and whose length can be substantially shorter than or equal to the length of bar 1. Member 14 acts as a molded article ejection member in that it extends downwardly far enough to come in contact with that portion of the parison that sticks above the molds after the molding operation is completed and therefore pushes the molded article out of the mold when the pinch bars are moved towards one another. The actuation of the pinch members to eject the molded article can be accomplished manually or can be programmed into the automatic controls in a manner obvious to one skilled in the art, e.g., mold half 22 can trip a microswitch as it moves away from mold half 23 after completion of the molding operation, the tripping of the microswitch causing immediate activation and deactivation of cylinder 12, the activation being sufficient to just cause arm 3 to move past mold 22 without going through the whole pinching cycle.

Bars 1 and 2 can be coated with a suitable material which prevents sticking of the bars to the heated parison, a preferred material being polydimethylsilicone.

In the operation of the apparatus of FIG. 1 or 2 to cause pinching of the parison by movement of bars 1 and 2 towards one another, preferably substantially into a contacting relationship with one another, the piston in cylinder 12 is actuated such as by passing high pressure air into the top of the cylinder above the piston thereby causing piston rod 13 and rack 11 to move downwardly. This movement of rack 11 causes gear 8 to rotate clockwise and gear 7 to rotate counterclockwise thereby swinging arms 3 and 4 towards one another. When in its lowermost position rack 11 can be retracted to reverse the movement of bars 1 and 2 by passing air under pressure into the bottom of cylinder 12 below the piston therein or by employing a spring biased piston which will automatically return to its uppermost position when the high pressure air is removed from the top portion of cylinder 12.

Figure 3:
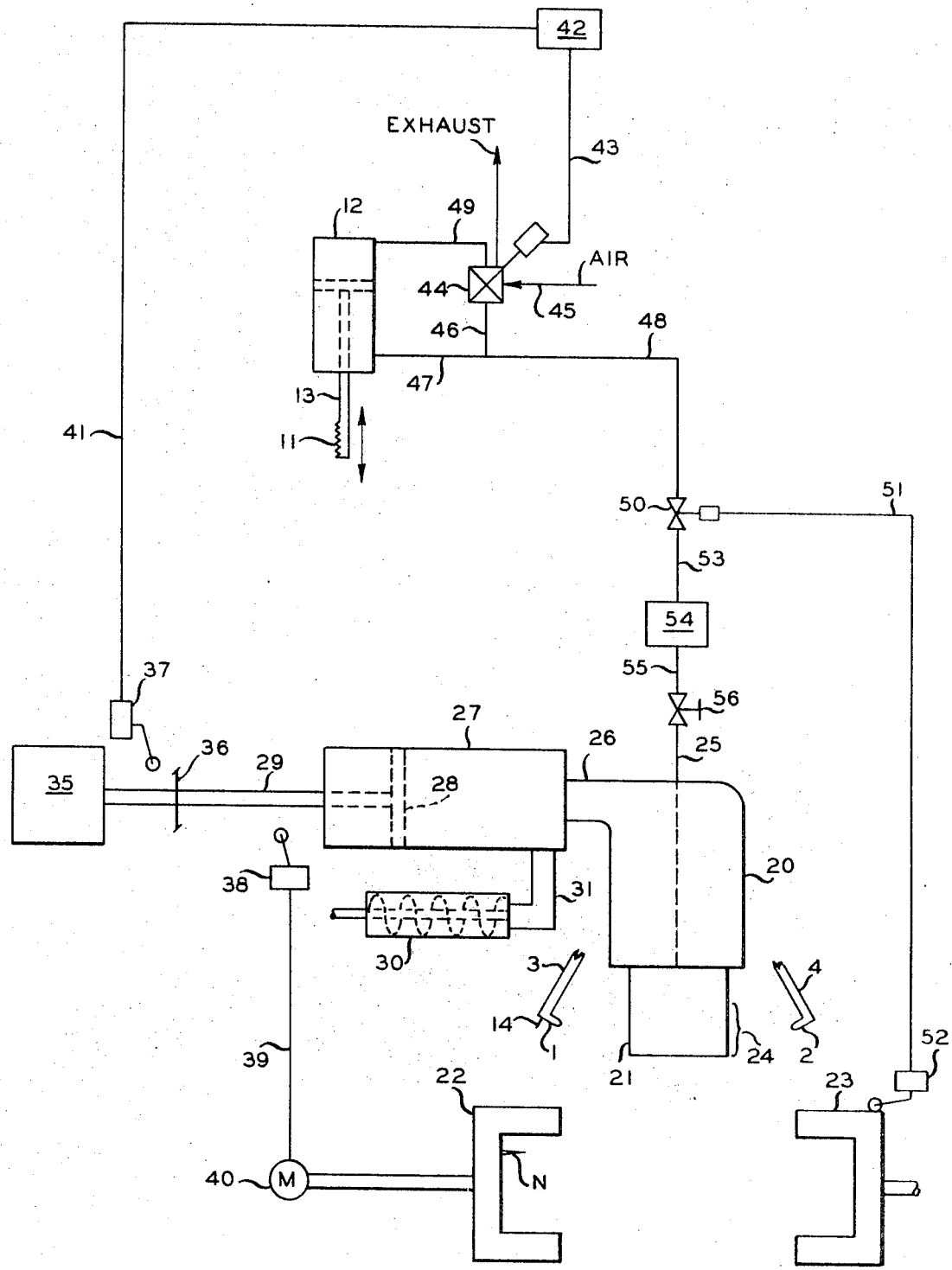
FIG. 3 shows a system embodying the control aspect of this invention.

FIG. 3 shows an extruder die 20 from which is issuing a hollow cylindrical parison 21. The apparatus of FIGS. 1 and 2 is oriented with respect to die 20 and parison 21 in the manner shown so that bars 1 and 2 will meet below die 20 but above molds 22 and 23 so that a portion 24 of the parison can extend below bars 1 and 2 when pinching the parison. The length 24 of parison 21 is necessary in order to achieve satisfactory sealing, e.g. heat sealing, of the bottom of the parison to make air-tight the interior of the parison that extends above the pinched portion. Conduit 25 extends into the interior of die 20 so as to provide preblowing air for parison 21.

Die 20 is operatively connected through conduit 26 to an accumulator 27 having therein a piston 28 whose supporting rod 29 extends exteriorly of the accumulator. Material, e.g. thermoplastic, from which the parison is formed is supplied to accumulator 27 from conventional extruder 30 (not all shown) through conduit 31.

Piston rod 29 is actuated by a conventional actuating means 35 which can be a hydraulic, pneumatic, or other conventionally operated cylinder. However, it is necessary that actuator 35 be adapted to allow the retraction of piston 28 under the force of material entering accumulator 27 from conduit 31.

Piston rod 29 carries an actuating arm 36 which is adapted to contact switches 37 and 38 and trip same. Switch 38 is operatively connected through electrical conduit 39 to motor 40 which moves molds 22 and 23 towards one another for a blow molding operation. The apparatus for controlling the movement of the molds through the molding cycle is conventional and therefore not shown.

Switch 37 is operatively connected through electrical conduit 41 to a conventional electrical delay timer 42. A suitable delay timer is that marketed by the Eagle Signal Company of Davenport, Iowa. The delay timer employed should be adapted to receive a signal from switch 37, pause a finite length of time before switching itself to the on position, and then pause another finite length of time after switching itself to the on position before switching itself off and resetting itself to await another signal from switch 37.

Delay timer 42 is operatively connected through electrical conduit 43 to four-way, solenoid operated, automatic spring return, valve 44. Valve 44 is operated by air from conduit 45, a suitable air pressure being conventional plant pressure, i.e. on the order of from about 100 to about 130 p.s.i.g. Valve 44 is spring biased so as to be normally in a position which causes air from 45 to pass through conduit 46 and into conduits 47 and 48.

The air passing through conduit 47 passes into the bottom of cylinder 12 thereby forcing the piston in that cylinder and rack 11 into the uppermost position. The uppermost position also maintains pinch bars 1 and 2 in their open, non-pinching position. The air in 48 passes to normally closed, solenoid operated, spring return, two-way valve 50.

Valve 50 is operated through electrical conduit 51 by microswitch 52 which is actuated by the opening of molds 22 and 23. Actuation of switch 52 by mold 23 causes the opening of normally closed valve 50 thereby allowing preblow air to pass through line 53 to air delay timer 54. Air delay timer 54 holds preblow air from passing into conduit 25 for a finite length of time, the finite length of time being determined by the amount of time required to extrude a length of parison above the point where it is pinched so that the internal volume of the parison is sufficient to accept the preblow air without rupturing. A suitable air delay valve is a Timac mechanical valve produced by the Mac Valve Company of Detroit, Mich. When the air delay valve 54 times out it passes the preblow air through line 55 and pressure regulator 56 into line 25 and therefore preblows the prepinched parison.

In operation, when molds 22 and 23 are closed needle N punctures the parison wall, air under normal blow molding pressure is admitted to the interior of the preblown parison, and the blow molding operation is carried out. During the blow molding operation accumulator 27 is filled from extruder 30 and piston 28 is pushed back by the material entering accumulator 27 from line 31. No preblow air is passed through conduit 25 at this time since valve 50 is normally closed.

At the termination of the blow molding operation molds 22 and 23 are opened and the molded article ejected, preferably by actuation of cylinder 12 by passing air through line 49 thereby causing pinch bars 1 and 2 to come together and ejection arm 14 to hit that portion of the blow molded article that extends above mold 22. Mold 23 trips microswitch 52 which then opens normally closed valve 50 to allow preblow air to pass through conduit 25 into open bottomed parison 21 after air delay valve 54 is timed out.

At about or shortly after the time the preblow air is admitted to line 25, accumulator 1 becomes filled with thermoplastic and arm 36 trips microswitch 37. Thus, electrical time delay 42 is actuated. Delay timer 42 hesitates a finite period of time which is generally a matter of a few seconds to allow a certain amount of parison 21 to be extruded so that length 24 of parison 21 extends below the bottom of members 1 and 2 when in the pinching position. Delay timer 42 then switches itself to the on timing position at which time four-way valve 44 is actuated so that air from line 45 is switched from its normal path through lines 46, 47, and 48 to its alternative path where it passes through line 49 to cause the piston in cylinder 12 and rack 11 to move downwardly and cause pinch bars 1 and 2 to close and prepinch parison 21. This switching of valve 44 cuts off the air from both lines 47 and 48 so that no preblow air passes into the parison while it is being prepinched, thereby preventing rupturing of the parison during or just after prepinching of same. When the air in line 48 is cut off air delay valve 54 resets itself to cause another delay when air is again passed thereinto.

After turning itself to the on position delay timer 42 times out in a fraction of a second, generally on the order of about one-tenth of a second, or just long enough for bars 1 and 2 to prepinch parison 21. When delay timer 42 times out it moves switch 44 back to its normal position so that air then passes through conduits 46, 47, and 48 thereby causing the piston in cylinder 12 and rack 11 to retract and open pinch bars 1 and 2 to the position shown in FIGS. 2 and 3. Also, at this time air is again passed through 48, still open valve 50, and line 53 into reset air delay valve 54.

Air delay 54 stops the flow of air for a few seconds, generally on the order of 1 to 2 seconds, to allow parison 21 to be extruded further so that the internal volume of the parison above the prepinch line is sufficient to contain the preblow air without rupturing. At the time air delay 54 times out, the volume of parison 21 is sufficiently large that it receives the preblow air and is extended thereby prior to closure of molds 22 and 23 around the preblown parison.

Just after air delay 54 times out and parison 21 is preblown, arm 36 contacts switch 38 to activate motor 40 and cause molds 22 and 23 to close around the preblown parison. When mold 23 is moved away from switch 52 valve 50 resumes its normal closed position thereby cutting off preblow air from line 25. The parison in the mold is then blow molded in a conventional manner and the cycle above is repeated.

Generally, the preblow air pressure is regulated by needle valve 56 and the pressure of the preblow air will vary widely depending upon the wall thickness of the parison, the weight of the blow molded article desired, the particular material from which the parison is formed, the temperature of the parison, and the like. The pressure of the preblow air or other fluid utilized as a preblowing medium can be in the range of from about 1 to about 20 p.s.i.g., although higher and lower pressures can be used.

The instant invention is applicable to any formable material but is particularly applicable to plastic materials such as thermoplastics. Generally, the invention can be practiced on homopolymers and copolymers formed from 1-olefins having from 2 to 8 carbon atoms per molecule, inclusive, polyamides, polyesters, polyvinyl alcohol, acrylic polymers, polyvinyl chloride, polyvinyl acetate, polyvinylidene chloride, and the like. The material in accumulator 27 and die 20 will be maintained substantially at the melt extrusion temperature for that material just the same as if the material were being extruded directly from extruder 30.

EXAMPLE

Polyethylene having a density of 0.96 gram per cubic centimeter at 25° C. and a melt index of 0.2 is extruded at a temperature of about 400° C. to produce a hollow cylindrical parison using the apparatus shown in FIG. 3. The parison is continuously extruded through die 20 and the stroke of arm 36 is adjusted so that it trips switch 37 and at the same time piston 28 is moved towards die 20 to extrude parison 21 so that the time period that elapses between activation of time delay 42 by switch 37 and the time at which time delay 42 switches itself to the on position allows for the extrusion of about 2 inches of open ended parison. Preblow air of about 3 p.s.i.g. is passed through parison 21 during extrusion of the 2 inches of parison and is then terminated by delay timer 42 switching itself to the on position thereby switching valve 44 to cause air to pass through line 49 instead of the normal path through 46. While the flow of preblow air is being terminated, the piston in cylinder 12 is being activated and after termination of the flow of preblow air, the parison is prepinched at a point intermediate its approximate 2 inch length. Pinch bars 1 and 2 are retained in the pinched position for about one-tenth of a second at which time delay 42 times out and switches valve 44 back to its normal position whereby air passes through lines 46, 47, and 48. Pinch bars 1 and 2 are thereby retracted and preblow air passes into air delay 54. After about a two-second delay of the air in 54 during which time the parison is extruded to a length of about 4 inches above the prepinched area, the preblow air is released by 54 and admitted to the interior of the parison.

Reasonable variations and modifications are possible within the scope of this disclosure without departing from the spirit and scope thereof.

We claim:
1. A method for blow molding hollow articles comprising: extruding a hollow parison downwardly from a die zone until a length thereof intermediate its final length is formed; while continuously and uninterruptedly forming said parison, pinching the walls of said intermediate length of said parison together at a point near an open end thereof to seal said parison; thereafter extruding said thus sealed parison to its final length and introducing preblow fluid pressure into the interior thereof to balloon same; and thereafter enclosing said thus ballooned parison in a molding zone and introducing sufficient fluid pressure into the interior thereof to expand same out into conformity with said molding zone.

2. A method according to claim 1 wherein said sealed parison is extruded to a greater length prior to said introduction of preblow fluid pressure so that said parison will have an internal volume above the sealed bottom thereof sufficient to receive the preblowing fluid without rupturing.

3. The method according to claim 1 wherein said parison is formed from at least one of polymers of 1-olefins having from 2 to 8 carbon atoms per molecule, inclusive, polyamides, polyesters, polyvinyl alcohol, acrylic polymers, polyvinyl chloride, polyvinyl acetate, and polyvinylidene chloride, said parison is extruded in the form of a heated hollow cylinder, said parison is sealed by contact of portions of opposing heated walls of the parison, said preblowing fluid is air, and the ballooned parison has an increased diameter of at least 5 percent over the diameter of the unballooned parison.

References Cited
UNITED STATES PATENTS

| | | | |
|---|---|---|---|
| 2,958,171 | 11/1960 | Deckers | 264—99UX |
| 3,308,216 | 3/1967 | Jacobs | 264—99 |
| 3,311,684 | 3/1967 | Heider | 264—98X |
| 3,318,985 | 5/1967 | Turner | 264—98 |
| 3,329,996 | 7/1967 | Marcus | 264—98X |
| 3,410,937 | 11/1968 | Winchester, Jr. | 264—98 |
| 3,294,885 | 12/1966 | Cines | 264—99 |
| 3,479,421 | 11/1969 | Armbruster | 264—98 |

ROBERT F. WHITE, Primary Examiner

A. M. SOKAL, Assistant Examiner

U.S. Cl. X.R.

264—98